June 3, 1941.  J. W. ARMBRUSTER  2,244,231
STATISTICAL RECORD
Filed Dec. 17, 1936  2 Sheets-Sheet 1
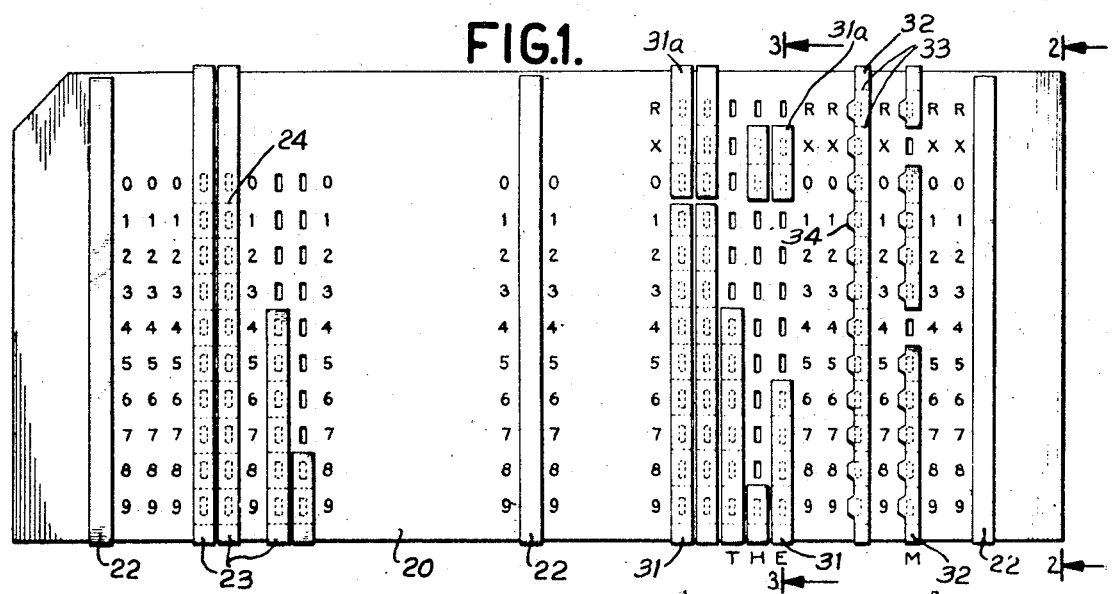
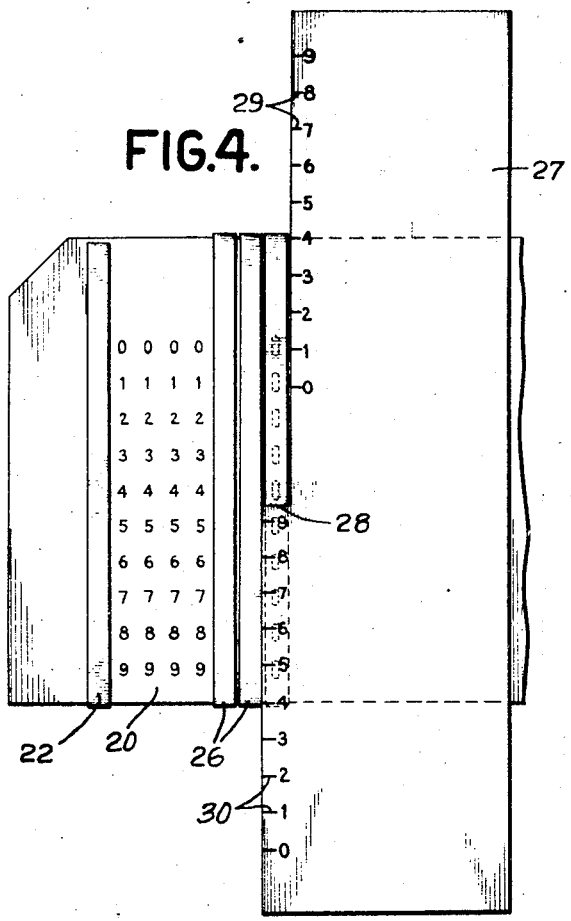
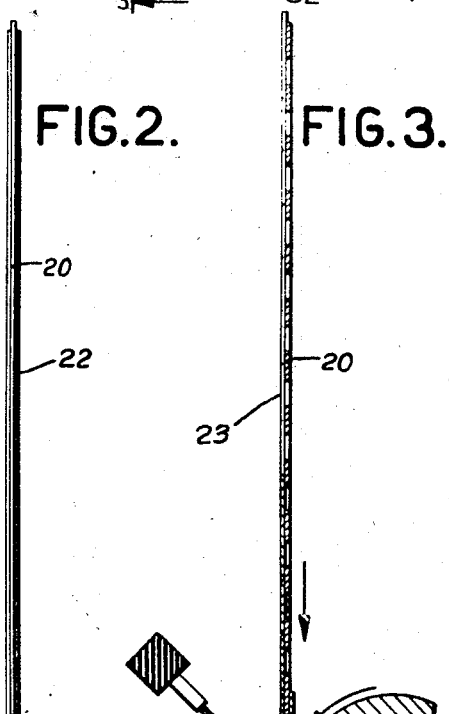
INVENTOR
John W. Armbruster
BY
W. M. Wilson
ATTORNEY June 3, 1941.                J. W. ARMBRUSTER                2,244,231
                              STATISTICAL RECORD
                             Filed Dec. 17, 1936           2 Sheets-Sheet 2

INVENTOR
John W. Armbruster
BY
ATTORNEY

Patented June 3, 1941

2,244,231

UNITED STATES PATENT OFFICE 2,244,231

STATISTICAL RECORD

John W. Armbruster, East Rockaway, N. Y., assignor to International Business Machines Corporation, New York, N. Y., a corporation of New York Application December 17, 1936, Serial No. 116,255

9 Claims. (Cl. 235—61.12)

This invention relates generally to means for making a statistical record and more specifically to a novel form of record adapted to control an accounting machine.

An object of the invention is to provide means for covering and uncovering index points on a control record. The record may be in the form of a perforated card, the perforations being made normally ineffective by coverings that are removable entirely or in sections to make certain perforations effective.

Another object of the invention is to provide means whereby cards designed for the representation of different data may be perforated in a similar fashion; in other words, gang punched cards may be used to represent variable data when treated according to the present invention.

A feature of the present invention is the provision of removable sectional tape coverings over columns of index points on a statistical control element or record card.

The invention contemplates the removal of an entire tape for the disclosure of prepared index points on the record or the removal of a portion or portions of the tape, the size of the portions removed determining the value represented by the portion of the card associated with the remaining portion of the tape.

Another object of the invention is to provide means for eliminating one step in the preparation of accounting records. The usual procedure in preparing accounting records involves gathering of data from various sources and the presentation of such data to a key punch operator for cutting the records to conform with the data. Records prepared in accordance with the present invention eliminate the need for a key punch operator, because the records are gang punched and all that is necessary is to reveal certain perforations and keep other perforations covered. For example, an inspector taking readings of a gas or electric meter may make a record of such readings directly on a record card by removing sections of the tapes covering such card to reveal selected perforations and thus make a record of the reading at first hand in condition for control of an accounting machine.

Another object of the invention is the provision of means for removing a plurality of parts of a tape to represent data in code. Alphabetical information may be conveyed by removing sections of tape from a control element.

Another object of the invention is the provision of means for recording installment payments by removing sections of tape from a prepared record as the payments are made.

The invention is illustrated by a set of drawings forming part of the specification. In the drawings:

Fig. 1 is a view showing a perforated record card with removable tapes arranged to record numerical and alphabetical data.

Fig. 2 is an end view of such card showing a fixed spacing tape encircling the lower edge of a card.

Fig. 3 is a sectional detail view showing the arrangement of a sectional tape upon a record card and the relationship of the two with respect to the sensing brushes of an accounting machine.

Fig. 4 is a detail view showing an indicator and cutting guide cooperating with a sectional tape to facilitate its severance at a differential point.

Fig. 5 shows a record card pre-punched and covered with tapes which may be removed to record installment payments.

Fig. 6 shows a portion of a card with a sectional tape adapted to be removed in small sections to record installment payments.

The record card 20 (Fig. 1) may be of the form shown corresponding to Patent No. 1,772,492 or in the form of the regular Hollerith forty-five column perforated record. Other means for preparing effective index points besides perforations may be used, for example, metallic inserts, embossings, etc. Such records control an accounting machine, as that revealed in Patent No. 1,976,617 for adding and printing a record card of the data represented on the record card. In such machines, the record cards are stacked together and then fed one by one past sensing brushes, such as the brushes 21 (Fig. 3) connected to electrical devices, for controlling the adding and printing devices; however, the invention is not to be limited to machines for sensing a card electrically because the removable tapes of the present invention are adapted to obstruct the sensing operation of the mechanical pins as well as obstruct the conduction of controlling electric current. In order to maintain the parallel relationship between the cards in a stack, each card may be provided with a set of stationary spacing strips 22. These strips are placed at both ends of the card and also at the center of the card to maintain a uniform thickness despite the removal of tapes at one end or the other. These fixed spacing tapes 22 are held on with an adhesive preparation coating one side of the tape. The tape is proportioned (Fig. 2) so that when stuck on the card it assumes a U-shape, passing around the bottom edge of the card.

Another form of tape is provided to cover the columns of index points. These tapes 23 are removable in sections or entirely. They may be in the form of material known as "Scotch tape" which is an opaque tape with one side coated with an adhering substance which holds the tape on an object without causing to bind thereon, so that neither the tape nor the object is torn or pitted when the tape is removed therefrom. It is at times desirable that the tapes be transparent, in which case they would be made of material such as "Cellophane" with a transparent adhesive coating on one side. The upper ends of the tapes project beyond the upper edge of the card 20 so that they may be grasped and pulled away from the card.

As shown at the left side of the card in Fig. 1, each tape covers a column of ten perforations representing numbers of an amount. Between the perforations the tape is weakened by a line of small perforations 24, making it easier to tear the tape at a desired point. In the example shown in Fig. 1, two of the tapes have been torn to reveal perforations representing the amount 37. It is noted that although other of the perforations are revealed by the differential removal of the tapes, these lower number perforations are ineffective when passing through an electrical accounting machine. As noted from Fig. 3, the perforations are sensed beginning with the "9" perforation and passing up the card toward the zero perforation, the first perforation encountered being the one that is effective. When cooperating with systems differing in mode of operation so that it is required that only one index point be revealed, another modification of the present invention may be used wherein a small section of the tape is removed, revealing but one effective index point.

Referring to Fig. 3, it is noted that the smooth side of the tape 23 faces the sensing brush 21 and the adhesive covered side of the tape faces towards the contact roller 25, but never touches the roller because it is separated therefrom by the record 20. In this same figure, it may be noted that the lower end of the tape 23 is turned under and up along the rear side of the card for a short distance to bind the end of the tape to the card and at the same time make a smooth entering edge for passing the cards through the sensing and feeding rollers.

Another form of tape is shown in Fig. 4 where it is seen that the tapes 26 are opaque and without tearing perforations 24, these characteristics being unnecessary because an indicating and cutting guide 27 is used in cooperation with the card to determine the point at which a tape is to be severed to reveal a desired index point. For example, in Fig. 4, the indicator 27 is placed so that a tape 26 may be torn against the cutting edge 28 at a point revealing the "4" index point. Two sets of number graduations 29 and 30 on the indicator 27 cooperate with the upper and lower edges respectively of the record card 20 to indicate any desired point of severance along the length of the tape.

Returning to consideration of the matter revealed in Fig. 1, it is noted that at the right end of the card shown in this view, the tapes are designed to record alphabetical information. These tapes are similar to the tapes 23 and 26 already discussed, but they are divided in two parts, a lower end 31 cooperating with the digit portions of the column of index points and an upper end 31a covering the special and zero index points. The code of representations used is the one revealed in Patent No. 2,016,682, where combinations of one of the three upper index points are combined with any one of the lower nine index points to represent a letter of the alphabet or a number. By making the tape in two sections, it is easier to remove the two parts of the tapes to reveal index points corresponding to the code. In the example shown, three of the tapes are severed to reveal index points corresponding to the word "The." To represent this word, one of the upper tapes 31a is removed entirely and the other two upper tapes are severed to reveal the "R" perforations. The lower strips 31 are severed at the "3", "8", and "5" index points respectively to correspond with the code.

Another form of removable tape is shown at the right end of the card in Fig. 1. This tape 32 is designed for either alphabetical or numerical representation and is well suited for control of mechanical machines because, when it is severed, the only index points revealed are the ones that are supposed to be effective. The tape 32 is divided between index points by short lines of indentations 33 to make it easy to tear the tape at any particular point. Opposite each of the index points underlying the tape is a tab 34 which does not have an adhesive backing so that it may be grasped and pulled toward the right in a horizontal direction to remove a small section of the tape covering one of the index points. For example, in the strip 32 at the right in Fig. 1, two sections of this tape have been removed, revealing the "x" and "4" index points corresponding to the letter "M" in the code mentioned hereinbefore. In the same way, any one or more of the index points may be removed from such sectional tape.

It is to be noted that the card 20 (Fig. 1) may be pre-punched at all index points. Such preparation of the card is a gang punching operation avoiding the personal attention of a key punch operator.

A card 35 (Fig. 5) is pre-punched to handle an account involving payments in installments. The specific problem disclosed is one wherein $100 is payable in $20 installments. After the first payment is made, the removable tape 36 may be taken off the card to reveal the perforations representing 20 and 80, showing the amount paid and the balance due. The other strips on the card may be of the same form as tape 36 or they may be in the form of separate tapes covering the amount paid and balance due in a separate way as done by the strips 37 covering the amounts 40 and 60 representing the total amount paid after the second payment and the amount due after said payment. The third installment payment is covered by a tape 36a similar in form to the strip 36 covering the first installment.

A further modification is revealed in the denominational strips 38 covering the index points revealing the fourth installment. When these four strips are removed they disclose perforations and indicate a total payment of $80 and a balance due of $20. The final payment may be noted when the three tapes 38a are removed from the right end of the card 35. It is contemplated that a card would have one or the other of the different forms of tapes shown in Fig. 5; the only purpose of showing the various forms in connection with the problem mentioned was to illustrate differences in the kinds of tapes that may be used.

Fig. 6 reveals another system for recording installment payments using removable tapes. The card 36 is pre-punched to take care of a condition wherein $100 is payable in $10 installments. A sectional tape 32a normally covers the column of index points representing the tens denominational order. Whenever a $10 payment is made, one of the sections of said tape is removed, starting from the top. As shown in Fig. 6, the tape is in the condition it will appear after two payments have been made.

While the foregoing is an accurate and complete disclosure of the various modifications of the present invention, it is to be understood that changes and variations will occur to those skilled in the art without departing from the spirit of the invention.

What is claimed is:

1. An element for controlling accounting machines provided with a plurality of digit representing index points which are effective when uncovered, and a sectional cover over said points with lines of weakness between the points adapting the cover for removal in sections to disclose any one or more than one of said index points.

2. A record card provided with a column of perforations and a removable tape covering said perforations, said tape being constructed in sections that are separated with lines of weakness between perforations so that it may be severed easily above or below any perforation and a portion of it removed to uncover a selected perforation or perforations.

3. A record element with a column of spaced index points, a tape with an adhesive coating attached to said element to cover said points, said tape being weakened at regularly spaced intervals along its length between index points and thus divided into sections each section covering an index point, and an uncoated tab on each section adapted to be grasped so that a section may be torn out of the tape to uncover an index point.

4. A rectangular element for controlling accounting machines provided with columns of index points intermediate the ends of said element, a series of removable covers over said columns of index points, one cover for each column of points, each cover adapted to be torn and a portion of it removed to reveal one or more of said points in a column, and a pair of fixed covers, one on each end of the element for thickening said ends of the element to the same thickness as the intermediate covered portion to condition the element to be stacked with other elements.

5. An element for controlling an accounting machine, said element being provided with a vertical column of index points, said points being representative of progressively larger digits along the column and any point being effective when uncovered, and a sectional strip cover arranged vertically over said points and adhering to the element but removable therefrom and provided with horizontal lines of weakness between sections of the strip covering the various points, whereby any desired section or sections of said strip may be easily torn away to uncover one or more of said index points, thereby making the column representative of the digit of the uncovered index point and when more than one point is uncovered the column is representative of the digit of the uncovered point related to the largest digit.

6. An element for controlling an accounting machine comprising a Hollerith record card with a column of digit index positions 0-9 all of which are perforated to be effective when revealed, and a strip cover over said perforated positions and adhering to the card but removable therefrom and adapted to be torn and a top portion of a differential length removed to reveal the 0 perforation and one or more perforations below the 0 perforation, whereby the card column may represent any digit value depending on the length of the remaining part of the strip, said digit value varying inversely to the length of the remaining part of the strip cover.

7. An element for controlling an accounting machine comprising a Hollerith record card with a column of index positions all of which are perforated to be effective when revealed, said column of perforations being divided into upper and lower groups related to parts of a code, a sectional tape cover over the top group of perforations and adhering to the card but removable therefrom and constructed with lines of weakness between several sections each section overlying an upper perforation, and another sectional tape cover over said lower group of perforations and adhering to the card but removable therefrom and constructed with lines of weakness between several sections each section overlying a perforation of the lower group, whereby one or more sections may be readily torn off either or both tapes to reveal one or more perforations of both groups and thereby expose a perforated code representation of a character.

8. An element for controlling an accounting machine comprising a Hollerith record card with a column of twelve index positions, all of which are perforated to be effective when revealed, and a sectional tape cover over said perforated positions and adhering to the card but removable therefrom, said tape being divided into sections, each section overlying one of said index positions and divided from the other sections by lines of weakness in the tape, whereby one or more sections may be readily torn off the tape to reveal one or more of the perforations in the column.

9. An element for controlling an accounting machine comprising a Hollerith record card with a plurality of columns of index positions, certain of which positions are perforated to be effective when revealed, and a plurality of tape covers over said index positions, each of said tapes normally overlying one of said columns of positions and adhering to the card but removable therefrom and adapted to be torn and a top portion of a differential length removed to reveal one or more perforations in the related column, the lower end of each tape extending under the lower edge of the card and part way up the back of the card to present a smooth rounded surface at the bottom of the card.

JOHN W. ARMBRUSTER.